United States Patent
Hoffmann et al.

(10) Patent No.: US 12,392,360 B2
(45) Date of Patent: Aug. 19, 2025

(54) METHOD AND APPARATUS FOR GENERATING HYDRAULIC POWER IN AN AIRCRAFT

(71) Applicant: Airbus Operations GmbH, Hamburg (DE)

(72) Inventors: Lars Hoffmann, Stuhr (DE); Rolf Goessing, Bremen (DE); Martin Hamm, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/622,719

(22) Filed: Mar. 29, 2024

(65) Prior Publication Data

US 2024/0328436 A1    Oct. 3, 2024

(30) Foreign Application Priority Data

Mar. 31, 2023  (EP) ..................... 23165763

(51) Int. Cl.
  *F15B 11/17*    (2006.01)
  *B64C 13/42*    (2006.01)
  (Continued)

(52) U.S. Cl.
  CPC .............. *F15B 11/17* (2013.01); *B64C 13/42* (2013.01); *B64D 41/00* (2013.01); *F04B 23/04* (2013.01);
  (Continued)

(58) Field of Classification Search
  CPC .......... F15B 11/17; F04B 23/04; F04B 23/06; F04B 49/06; F04B 49/065; B64C 13/40; B64C 13/42; B64C 13/504; B64C 13/505
  See application file for complete search history.

(56) References Cited

U.S. PATENT DOCUMENTS

| | | | |
|---|---|---|---|
| 6,851,207 B2 * | 2/2005 | Yoshimatsu | E02F 9/2012 60/431 |
| 6,962,050 B2 * | 11/2005 | Hiraki | F15B 11/17 60/486 |

(Continued)

FOREIGN PATENT DOCUMENTS

| | | | | |
|---|---|---|---|---|
| DE | 102009019564 A1 * | 11/2010 | | F04B 23/04 |
| EP | 4105120 A1 | 12/2022 | | |

OTHER PUBLICATIONS

Extended European Search Report for EP Application No. 23165763.6 mailed Sep. 12, 2023, 5 pages.

*Primary Examiner* — Michael Leslie
(74) *Attorney, Agent, or Firm* — Nixon & Vanderhye P.C.

(57) ABSTRACT

An apparatus and method for hydraulically powering at least one consumer of a hydraulic system of an aircraft is disclosed including a first electrical power source and a first electrically driven motor pump (MPU1) electrically powered by the first electrical power source, a second electrical power source and a second electrically driven motor pump (MPU2) electrically powered by the second electrical power source (B), and a hydraulic power generation control which controls a supply of electrical energy from the first and second electrical power sources to the first and second motor pumps (MPU1, MPU2). A method is disclosed for determining the actual available electrical power (APA, APB) of each of the first and second electrical power sources and to set a load factor (UPA, UPB) of each motor pump in order to share a load to generate hydraulic power demanded from the at least one consumer between the first and second motor pumps.

11 Claims, 4 Drawing Sheets

(51) Int. Cl.
*B64D 41/00* (2006.01)
*F04B 23/04* (2006.01)
*F04B 49/06* (2006.01)
*F15B 13/06* (2006.01)

(52) U.S. Cl.
CPC .............. *F04B 49/06* (2013.01); *F15B 13/06* (2013.01); *F15B 2211/20515* (2013.01)

(56) References Cited

U.S. PATENT DOCUMENTS

| | | | |
|---|---|---|---|
| 6,989,640 B2 * | 1/2006 | Yoshimatsu | E02F 9/2292 |
| | | | 318/140 |
| 9,422,052 B2 * | 8/2016 | Kondo | B64C 13/504 |
| 10,697,150 B2 * | 6/2020 | Takahashi | E02F 9/22 |
| 11,668,149 B2 * | 6/2023 | Leach | F04B 17/03 |
| | | | 60/413 |
| 12,049,302 B2 * | 7/2024 | Pepper | F15B 11/17 |
| 2014/0140864 A1 * | 5/2014 | Harten | F04B 9/02 |
| | | | 417/539 |
| 2014/0151501 A1 | 6/2014 | Kondo | |
| 2022/0098832 A1 * | 3/2022 | Hickey | B60L 58/22 |
| 2022/0169367 A1 | 6/2022 | Pepper | |

* cited by examiner

METHOD AND APPARATUS FOR GENERATING HYDRAULIC POWER IN AN AIRCRAFT

CROSS REFERENCE TO RELATED APPLICATION

This application claims priority to European Patent Application Number EP 23165763.6, filed Mar. 31, 2023, the entire contents of which is hereby incorporated by reference.

BACKGROUND

The present disclosure relates to a hydraulic power generation apparatus for hydraulically powering at least one consumer of a hydraulic system of an aircraft. Moreover, the disclosure relates to a method for operating a hydraulic system of an aircraft including controlling generation of hydraulic power. More specifically, the disclosure relates to an aircraft having such a hydraulic system.

SUMMARY

The invention encompasses increasing availability and reliability of hydraulic power generated in an aircraft from electric energy.

The invention provides a hydraulic power generation apparatus according to claim 1. Further, the invention provides a method and an aircraft as indicated in the further independent claims.

Various exemplary embodiments are subject-matters of the dependent claims.

The invention encompasses having a hydraulic power generation apparatus for hydraulically powering at least one consumer of a hydraulic system of an aircraft, comprising:
  a first electrical power source and a first electrically driven motor pump electrically powered by the first electrical power source,
  a second electrical power source and a second electrically driven motor pump electrically powered by the second electrical power source,
  and a hydraulic power generation control which controls
    a supply of electrical energy from the first and second electrical power sources to the first and second motor pumps,
  wherein the hydraulic power generation control is configured to determine the actual available electrical power of each of the first and second electrical power sources and to set a load factor of each motor pump in order to share a load to generate hydraulic power demanded from the at least one consumer between the first and second motor pumps, wherein each load factor is set depending from the actual available electrical power.

The hydraulic power generation control may be configured to set the load factors depending from a previous load condition of the first and second power source and/or of the first and second motor pump.

The hydraulic power generation control may be configured to set the load factors such that, in a first operation interval, the first motor pump has a higher load as the second motor pump and, in a subsequent second operation interval, the first motor pump has a lower load as the second motor pump.

The hydraulic power generation control may be configured to inform the at least one consumer about an actual available maximum power and to request the at least one consumer to limit the demand accordingly.

The hydraulic power generation control may be configured to conduct the control such that the first and second power motors are used alternatively.

The hydraulic power generation control may be configured to allow a boost mode of the at least one consumer depending from the actual available power, and to control the first and second motor such that a power over a nominal power is generated in reply to a boost demand.

According to an exemplary embodiment, a method of operating an hydraulic system of an aircraft is provided, wherein the hydraulic system comprises
  a first electrical power source and a first electrically driven motor pump electrically powered by the first electrical power source,
  a second electrical power source and a second electrically driven motor pump electrically powered by the second electrical power source, and
  at least one consumer to be powered hydraulically, the method comprising the steps:
  a) determining the actual available electrical power of each of the first and second electrical power sources and
  b) setting a load factor of each motor pump in order to share a load to generate hydraulic power demanded from the at least one consumer between the first and second motor pumps, wherein each load factor is set depending from the actual available electrical power.

The load factors may be set in step b) depending from at least one or several of:
  b1) a previous load condition of the first and second pump motors,
  b2) a previous load condition of the first and second power sources, and
  b3) power demand of the at least one consumer.

The step b) may comprise:
  b4) setting the load factors such that, in a first operation interval, the first motor pump has a higher load as the second motor pump and, in a subsequent second operation interval, the first motor pump has a lower load as the second motor pump.

The method may comprise the further step:
  limiting demands or allowing higher demands from the at least one consumer in response to the determined actual available electrical power of the first and second power sources.

The first and second power motors may be used alternatively in subsequent operation intervals.

According to an exemplary embodiment, an aircraft is provided having a hydraulic system including at least one consumer and a hydraulic power generation apparatus according to any of the exemplary embodiments.

The invention relates to the field of hydraulic fluid systems. The present invention encompasses uses in the future aircraft projects that utilise hydraulic system(s) with hydraulic power packs (HPPs) and/or electro-hydraulic systems.

The present invention also relates to an aircraft hydraulic power pack active power shifting.

The hydraulic power generating apparatus may be a hydraulic power pack for an aircraft. A hydraulic power pack normally includes one or two or more motor pump units (MPUs). Conventional hydraulic power packs may be powered electrically by an electrical power source. Embodiments of the invention include a hydraulic power pack (HPP) that has at least two motor pump units and is powered electrically by at least two electric power sources. The HPP is powering hydraulically a system comprising or consisting of one or more consumers. Hence, embodiments of the invention relate to HPP(s) with two or more motor pump units and supplied by more than one electric power source.

The electric power source comprises of or several units of the group consisting of a battery, a battery pack, a mechanically driven generator, a fuel cell, a solar panel, an energy harvester, an array of super caps, and a photoelectric cell array.

The invention encompasses that in case of loss or limited available electric power the intended function of the hydraulic consumer(s) can be maintained at full performance or with limited performance. Loss of the hydraulic system is thereby prevented.

According to an exemplary embodiment, the electric loads in the power network can be balanced considering individual generator load situations across the aircraft. This can prevent generator overloads or bundle loads according to needs.

According to an exemplary embodiment, the hydraulic output load control systems (i.e. consumer controls) can be requested to arrange themselves in such a way (e.g. by shedding of non-essential operations and reduction or staggering/sequencing of the remaining operations) that a required target (demand) is not exceeded.

According to an exemplary embodiment, reduce wear of the hydraulic power generation drives and will therefore increase availability and reliability as the hydraulic load on the drive-chain (i.e. Motor-Pump-Unit including Motor Control Electronic) is reduced—e.g., the Motor-Pump Units can be used in alternating sequence (e.g. one per flight).

According to an exemplary embodiment, HPP(s) with two or more Motor-Pump Units and supplied by more than one electric power sources is disclosed.

Exemplary embodiments may have the following functionality:

The means is based on
1) a determining unit sensing of available electrical power of each electrical source (in real-time).
2) a decision logic determining a load factor of each individual drive-chain (i.e. Motor-Pump-Unit including Motor Control Electronic). The load factor represents a means to allocate available power to a given drive chain in respect to its rated power.
3) a control logic shifting power from a drive-chain with low available power to a drive-chain with sufficient available power. "Shifting" thereby means not only an "on/off"-characteristic but an adapted power load ratio (example: 20% power at MPU 1 and 80% power at MPU 2).
4) existing Motor Control Electronics may be used and relevant criteria/parameter from the electrical network (e.g. available power at power source) is added.

In some exemplary embodiments, the following function can be implemented additionally:

Short term consumer demands greater than 100% of the nominal demand can be allocated to the hydraulic power consumers provided the available electrical power is sufficient. The MPU can be operated in a "boost mode" for such a short term scenario.

Some exemplary embodiments of the method may comprise at least one, several or all of the following features/steps:
1) The following parameters will be recorded/evaluated in real-time/continuous:
   Available power in electric power network
   power demand in hydraulic system
   adaptations of power transfer from electrical available power through the electro-hydraulic drive chain to hydraulic power consumers (demands).
2) In adapted/calculated intervals: Status/Condition of MPU/MCE will be taken into account—balance wear/lifecycle, e.g. MPU 1 is run in flight 1, MPU 2 is run in flight 2. In case of emergency the inactive MPU can be used in addition.

In some exemplary embodiments, in case of low electric power supply the nominal hydraulic system pressure can be reduced/adapted to allow high flow (i.e. high actuator deflection rates)/low pressure/force conditions. This feature can be used also for low load conditions, such as pre-flight check of flight control actuators on ground.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Figure 1:
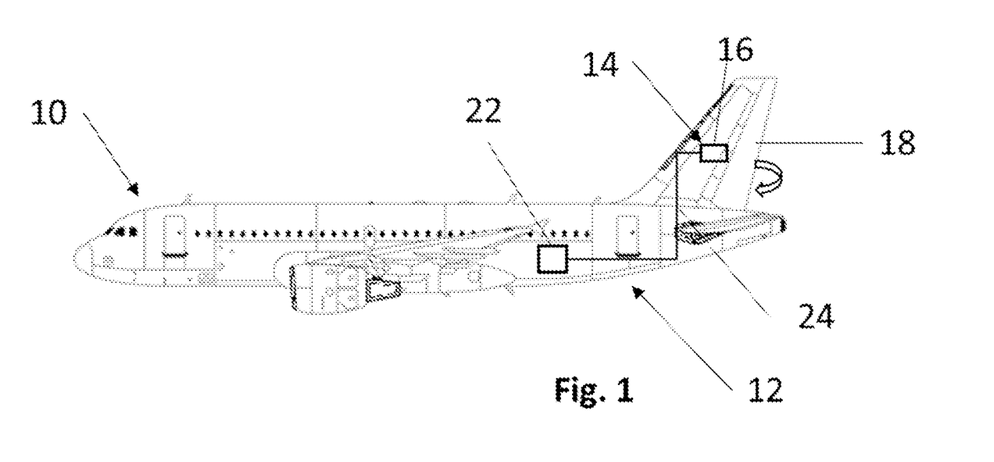
FIG. 1 is a schematical side view of an aircraft comprising a hydraulic system with at least one consumer and a hydraulic power generating apparatus.

FIG. 1 shows an aircraft 10 comprising a hydraulic system 12. The hydraulic system 12 comprises at least one consumer 14, such as a hydraulic actor 16 for driving movement of a component 18 of the aircraft 10. It is clear that the hydraulic system 12 may comprise several consumers 14, e.g. a plurality of actors 16 for driving different movements of one or several components 18. Each consumer 14 may be controlled by a hydraulic consumer control 20. Further, the hydraulic system 12 comprises at least one hydraulic power generating apparatus 22 for providing the at least one consumer 14 with hydraulic power. The at least one consumer 14 is connected to the hydraulic power generating apparatus 22 via hydraulic lines 24.

Figure 2:
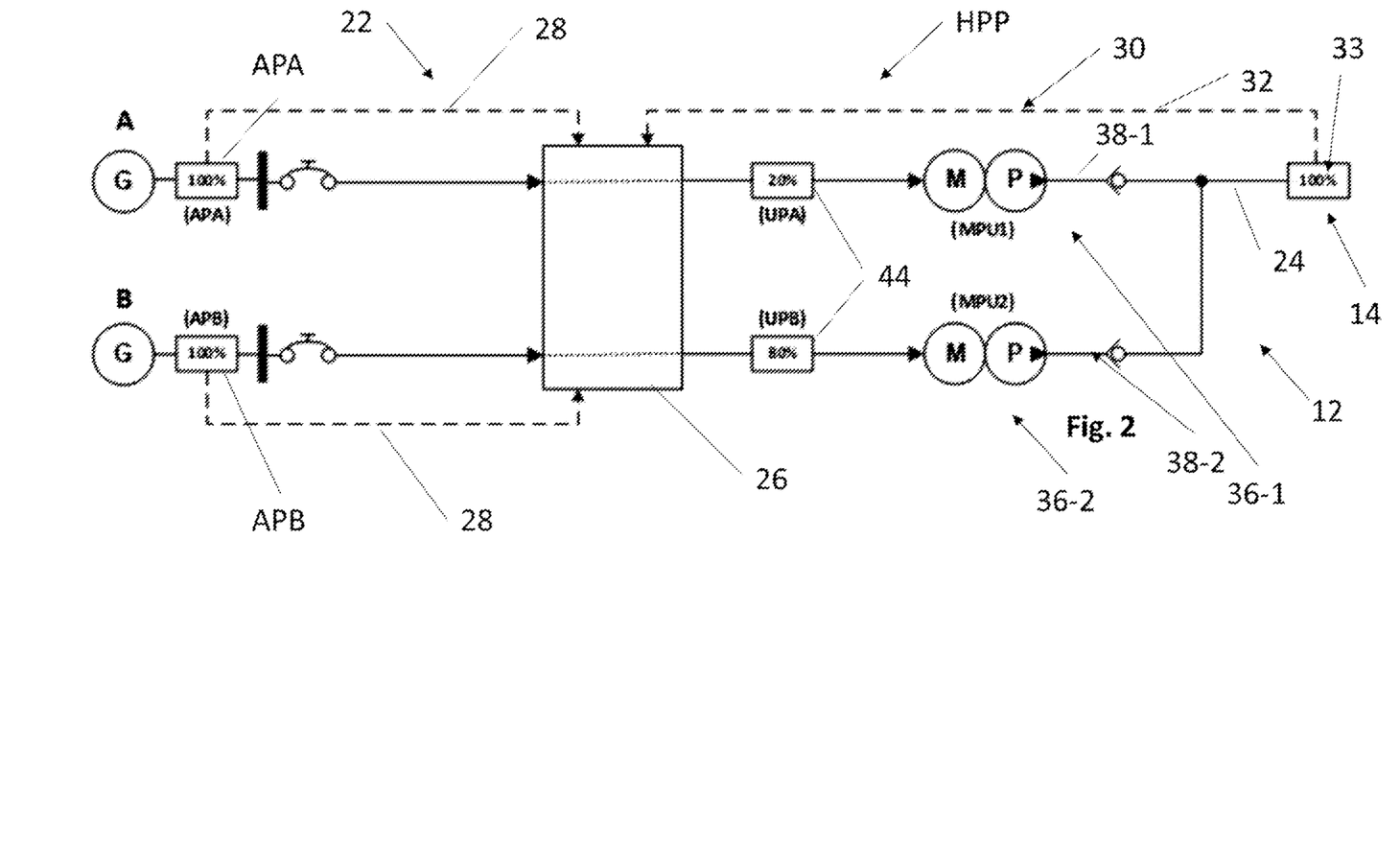
FIG. 2 is a block diagram schematically illustrating the hydraulic system and the hydraulic power generating apparatus during a possible operation mode in a normal operation.
Figure 3:
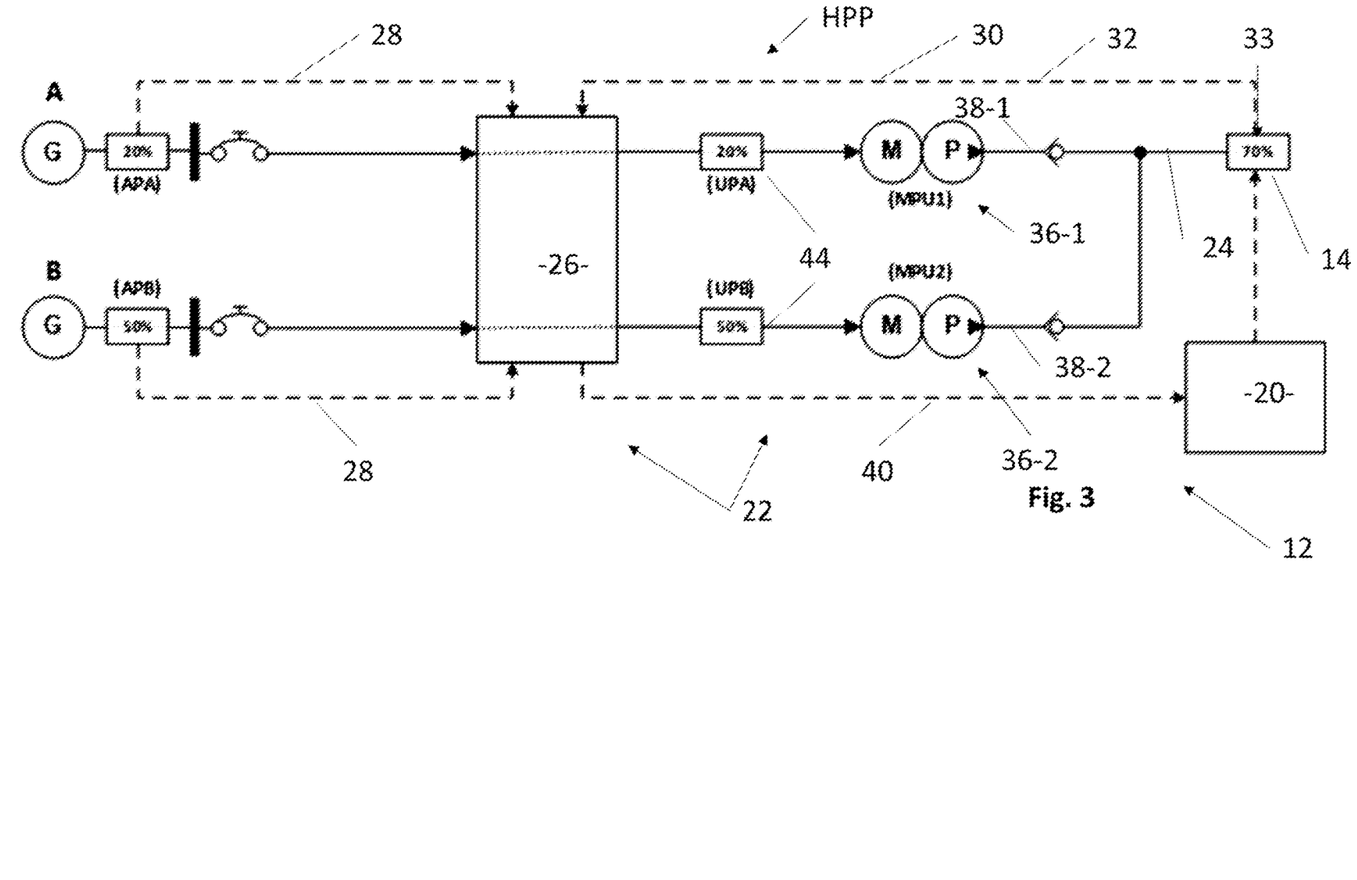
FIG. 3 is a block diagram schematically illustrating the hydraulic system and the hydraulic power generating apparatus during a possible operation mode in an abnormal operation.
Figure 4:
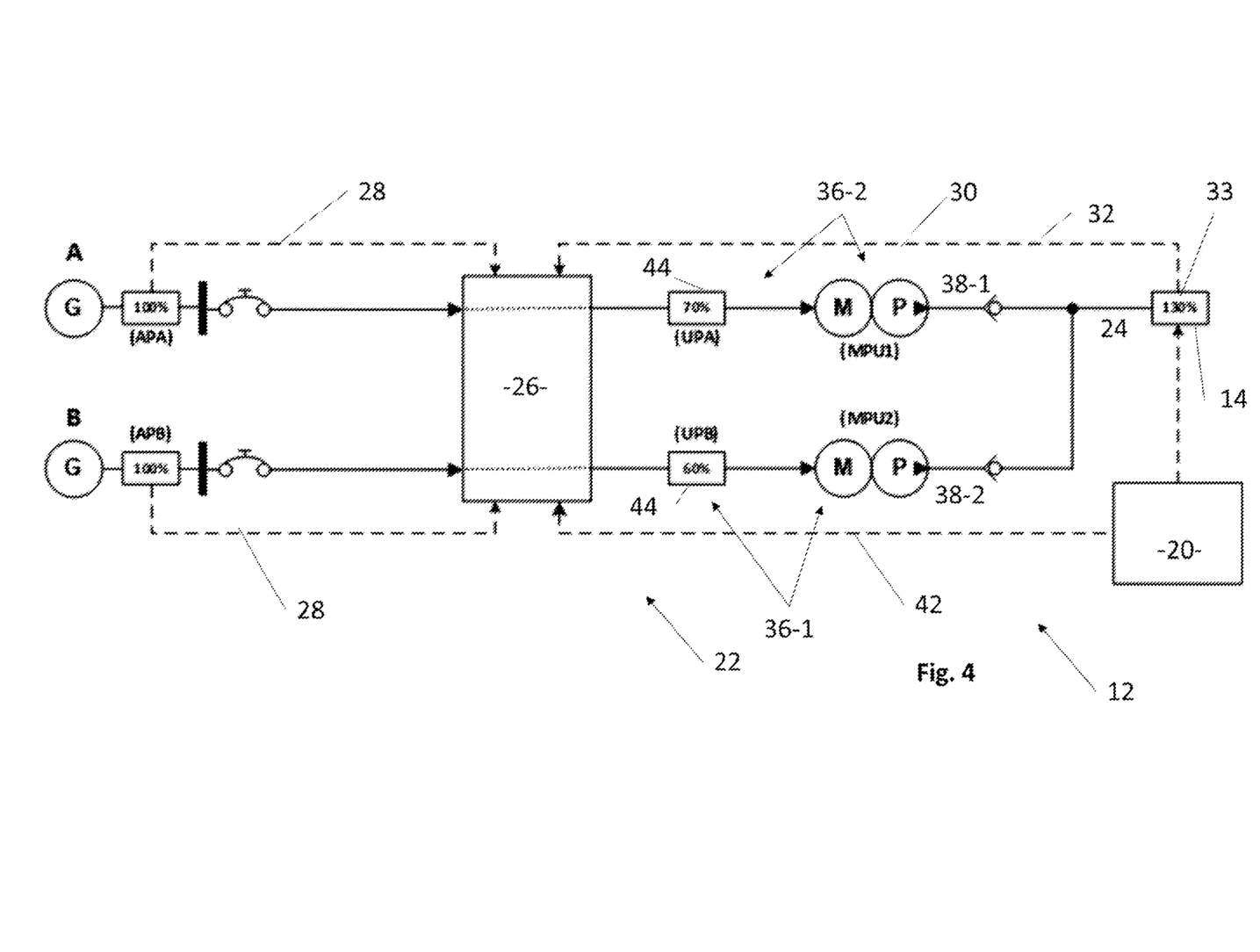
FIG. 4 is a block diagram schematically illustrating the hydraulic system and the hydraulic power generating apparatus during a possible boost mode operation.

FIGS. 2 to 4 show block diagrams of the hydraulic system 12 including the hydraulic power generating apparatus 22. The hydraulic power generating apparatus 22 may be an electro-hydraulic system or a hydraulic power pack HPP.

According to an exemplary embodiment, the hydraulic power generating apparatus 22 comprises a first electrical power source A and a first electrically driven motor pump MPU1 electrically powered by the first electrical power source A, a second electrical power source B and a second electrically driven motor pump MPU2 electrically powered by the second electrical power source B, and a hydraulic power generation control 26 which controls a supply of electrical energy from the first and second electrical power sources A, B to the first and second motor pumps MPU1, MPU2.

Although not shown, the hydraulic power generating apparatus 22 may comprise more than two motor pump units and/or more than two electrical power sources.

The electrical power sources A, B may comprise a generator G for converting mechanical energy into electricity and/or any other sources of electrical energy such a battery, PV cells, fuel cells, super caps, energy harvester, . . . .

Further, the hydraulic power generating apparatus 22 comprises a E-power determining device 28 for determining the actual available electrical power APA of the first electrical power source A and for determining the actual available electrical power APB of the second electrical power source B. The hydraulic power generation control 26 receives the information from the actual available electrical powers ABA; APB from the E-power determining device 28.

Further, the hydraulic system 12 comprises a hydraulic load sensing device 30 for sensing the actual hydraulic load 32 of the hydraulic system 10. The actual hydraulic load 32 may be sensed individually for each consumer 14 or total for the load at the output of the HPP, for example at the supply hydraulic line 24.

Each motor pump MPU1, MPU2 comprises an electric motor M and a hydraulic pump P driven by the motor M. Further, the motor pump unit constituting the respective motor pumps MPU1, MPU2 may comprise a motor control 44 (especially with a frequency converter) controlling the electric motor M. The first motor pump MPU1 with its motor control 44 constitutes a first drive chain 36-1, and the second motor pump MPU2 with its motor control 44 constitutes a second drive chain 36-2. The outputs 38-1, 38-2 of the first and second drive chains 36-1, 36-2 are both connected to the hydraulic supply line 24 for supplying the at least one consumer 14 with hydraulic power.

The hydraulic power generation control 26 receives the information about the actual hydraulic load 32 and the hydraulic power demand 33 of the at least one consumer 14 from the hydraulic load sensing device 30. The hydraulic power generation control 26 is configured to control the motor pumps MPU1, MPU2.

In order to control the motor pumps MPU1, MPU2, the hydraulic power generation control 26 comprises a decision logic to determine a load factor UPA, UPB for each of the motor pumps and to supply the motor pumps MPU1, MPU2 with electric power in accordance with the determined load factors UPA, UPB.

The load factor UPA, UPB for each motor pump is determined depending from the actual available power APA, APB of each of the electric sources A, B, from the hydraulic load 32 and the demand 33, and from status and conditions of the motor pumps MPU1, MPU2, especially previous load conditions and the load history thereof.

The hydraulic power generation control 26 comprises a control logic configured to shift power from one of the drive chains 36-1 with low available power to a drive chain 36-2 with sufficient available power.

Possible exemplary operation scenarios of the hydraulic system 12 and the hydraulic power generating apparatus 22 are indicated in the following tables 1 and 2. In a normal operation, as shown in the table 1, the electrical power sources A, B both supply enough electrical power for operating the at least one consumer 14. The electrical power sources A, B may be redundant power sources. Table 2 shows an abnormal or emergency operation, for example where one of the power sources A, B is not able to supply full energy or is even unavailable or where special demands arise. The available powers APA, APB, the load factors UPA, UPB and demands 33 are given in percent of their nominal values.

TABLE 1

Normal operation, e.g. (%)

| | APA/APB | UPA/UPB | Demand | |
|---|---|---|---|---|
| case 1 | 100/100 | 20/80 | 100 | shared asymmetrically, full demand |
| case 2 | 100/100 | 50/50 | 100 | shared equally, full demand |
| case 3 | 100/100 | 0/50 | 50 | single source (e.g. alternating) |
| case 4 | 100/100 | 25/25 | 50 | shared equally, low demand |

TABLE 2

Abnormal/Emergency operation, e.g. (%)

| | APA/APB | UPA/UPB | Demand | |
|---|---|---|---|---|
| case 5 | 50/100 | 30/70 | 100 | source A reduced, full demand |
| case 6 | 0/100 | 0/100 | 100 | source A unavailable, full demand |
| case 7 | 20/50 | 20/50 | 70* | both sources reduced, demand limited |
| case 8 | 100/100 | 70/60 | 130** | both sources available, very high demand (boost) |

*consumer system controls are requested to reduce overall power demands (e.g. shed, sequence, reduce)
**consumer system controls request a power boost (e.g. during specific manoeuvre)

FIG. 2 shows the hydraulic system 12 in case 1. The hydraulic power generating control 26 sets the load factor UPA for the first motor pump MPU1 to 20%, and the load factor UPB for the second motor pump MPU2 to 80%. Hence, the power is shifted more to the second motor pump MPU2. This is especially advantageous, when the first motor pump MPU1 had a higher load or longer operation time before. The power may also be shifted equally (case 2 and case 4). The motor pumps MPU1, MPU2 may also be used in an alternating manner, e.g. the first motor pump MPU1 is used in a first flight, and the second motor pump MPU2 is used in a following second flight. This is indicated in case 3.

FIG. 3 shows the hydraulic system in case 7. In this example, the first electrical power source A is reduced and has an actual available power APA of 20%. The hydraulic power generation control 26 shifts a large part of the power to the second motor pump MPU2.

The hydraulic power generating control 26 is connected to hydraulic consumer controls 20 in order to request a limiting of the overall target 40, here for example 70%. The hydraulic consumer controls 20 are configured such that they limit accordingly the maximum overall demand to 70%. This may be done by shedding non-essential operations and reduction or staggering or sequencing of the remaining operations.

FIG. 4 shows the hydraulic system 12 in case 8. The hydraulic power generation control 26 receives a very high demand 33 from the hydraulic consumer controls 20—indicated as boost request 42. Such a short-term consumer demand 33 greater than 100% of the nominal demand can be allocated to the hydraulic consumers 14 provided that the available electrical power APA, APB is sufficient. In such case, the motor pumps MPU1, MPU2 operate in a boost mode for such a short time scenario.

Accordingly, a hydraulic power generation apparatus (22) for hydraulically powering at least one consumer (14) of a hydraulic system (12) of an aircraft (10) has been described, comprising:

a first electrical power source (A) and a first electrically driven motor pump (MPU1) electrically powered by the first electrical power source (A), a second electrical power source (B) and a second electrically driven motor pump (MPU2) electrically powered by the second electrical power source (B), and a hydraulic power generation control (26) which controls a supply of electrical energy from the first and second electrical power sources (A, B) to the first and second motor pumps (MPU1, MPU2), wherein the hydraulic power generation control (26) is configured to determine the actual available electrical power (APA, APB) of each of the first and second electrical power sources (A, B) and to set a load factor (UPA, UPB) of each motor pump (MPU1, MPU2) in order to share a load to generate hydraulic power demanded from the at least one consumer (14) between the first and second motor pumps (MPU1, MPU2), wherein each load factor is set depending from the actual available electrical power (APA, APB).

The hydraulic power generation control 26 may be implemented in software or hardware, on existing electronic control units, e.g. those of the motor controls, or on additional electronic control units.

Further, a method of operating a hydraulic system (12) of an aircraft (10) has been described, the hydraulic system (12) comprising:

a first electrical power source (A) and a first electrically driven motor pump (MPU1) electrically powered by the first electrical power source (A), a second electrical power source (B) and a second electrically driven motor pump (MPU2) electrically powered by the second electrical power source (B), and at least one consumer (14) to be powered hydraulically, the method comprising the steps:

a) determining the actual available electrical power (APA, APB) of each of the first and second electrical power sources (A, B) and b) setting a load factor (UPA, UPB) of each motor pump (MPU1, MPU2) in order to share a load to generate hydraulic power demanded from the at least one consumer (14) between the first and second motor pumps (MPU1, MPU2), wherein each load factor (UPA, UPB) is set depending from the actual available electrical power (APA, APB).

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft, comprising:
a hydraulic system,
at least one component,
a hydraulic power generation apparatus for hydraulically powering the at least one component, the hydraulic system of the aircraft, comprising:
a first electrical power source and a first electrically driven motor pump (MPU1) electrically powered by the first electrical power source,
a second electrical power source and a second electrically driven motor pump (MPU2) electrically powered by the second electrical power source,
a hydraulic power generation control which controls a supply of electrical energy from the first and second electrical power sources to the first and second motor pumps (MPU1, MPU2),
wherein the hydraulic power generation control is configured to determine an actual available electrical power (APA, APB) of each of the first and second electrical power sources and to set a load factor (UPA, UPB) of each motor pump (MPU1, MPU2) in order to share a load to generate hydraulic power demanded from the at least one component between the first and second motor pumps (MPU1, MPU2),
wherein each load factor is set depending from the actual available electrical power (APA, APB), and
wherein the hydraulic power generation control is integrated with the aircraft hydraulic system, the aircraft hydraulic power generation apparatus is incorporated into an aircraft, and the aircraft hydraulic power generation apparatus supplies hydraulic power to at least one hydraulic actuator for driving movement of the at least one aircraft component.

2. The aircraft according to claim 1, wherein the hydraulic power generation control is configured to set the load factors (APA, APB) in response to a previous load condition of the first and second power source, and/or of the first and second motor pump (MPU1, MPU2).

3. The aircraft according to claim 1, wherein the hydraulic power generation control is configured to set the load factors (UPA, UPB) such that, in a first operation interval, the first motor pump (MPU1) has a higher load as the second motor pump (MPU2) and, in a subsequent second operation interval, the first motor pump (MPU1) has a lower load than the second motor pump (MPU2).

4. The aircraft according to claim 1, wherein the hydraulic power generation control is configured to inform the at least one component about an actual available maximum power and to request the at least one component to limit the overall demand accordingly.

5. The aircraft according to claim 1, wherein the hydraulic power generation control is configured to conduct the control such that the first and second power motors (MPU1, MPU2) are used alternatively.

6. The aircraft according to claim 1, wherein the hydraulic power generation control is configured to allow a boost mode of the at least one component depending from the actual available power, and to control the first and second motor (MPU1, MPU2) such that an overall hydraulic power over a nominal overall hydraulic power is generated in reply to a boost demand.

7. A method of operating a hydraulic system of an aircraft, the hydraulic system comprising:
providing at least one aircraft component,
providing a hydraulic power generation apparatus for hydraulically powering the at least one aircraft component, a first electrical power source (A) and a first electrically driven motor pump (MPU1) electrically powered by the first electrical power source (A), a second electrical power source (B) and a second electrically driven motor pump (MPU2) electrically powered by the second electrical power source (B), and at least one component to be powered hydraulically, the method comprising the steps:

a) determining an actual available electrical power (APA, APB) of each of the first and second electrical power sources and b) setting a load factor (UPA, UPB) of each motor pump (MPU1, MPU2) in order to share a load to generate hydraulic power demanded from the at least one consumer between the first and second motor pumps (MPU1, MPU2), wherein each load factor (UPA, UPB) is set depending from the actual available electrical power (APA, APB), wherein a hydraulic power generation control is integrated with the aircraft hydraulic system, the aircraft hydraulic power generation apparatus is incorporated into the aircraft, and the aircraft hydraulic power generation apparatus supplies hydraulic power to at least one hydraulic actuator for driving movement of the at least one aircraft component.

8. The method according to claim 7, wherein the load factors (UPA, UPB) are-set in step b) entail at least one or several of:
- a previous load condition of the first and second pump motors (MPU1, MPU2),
- a previous load condition of the first and second power sources (A, B), and
- power demand of the at least one consumer.

9. The method according to claim 7, wherein the step b) further comprises:
setting the load factors (UPA, UPB) such that, in a first operation interval, the first motor pump (MPU1) has a higher load than the second motor pump (MPU2) and, in a subsequent second operation interval, the first motor pump (MPU1) has a lower load than the second motor pump (MPU2).

10. The method according to claim 7, further comprising limiting demands or allowing higher demands from the at least one consumer in response to the determined actual available electrical power (APA, APB) of the first and second power sources (A, B).

11. The method according to claim 7, wherein the first and second motor pumps (MPU1, MPU2) are used alternatively in subsequent operation intervals.

* * * * *